O. H. GOETZ.
AUTOMOBILE BUMPER.
APPLICATION FILED AUG. 6, 1921.
1,394,893.
Patented Oct. 25, 1921.
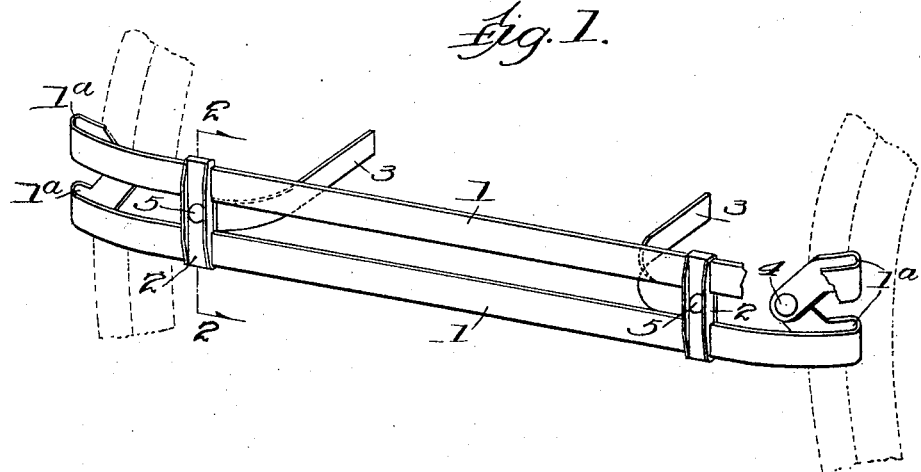
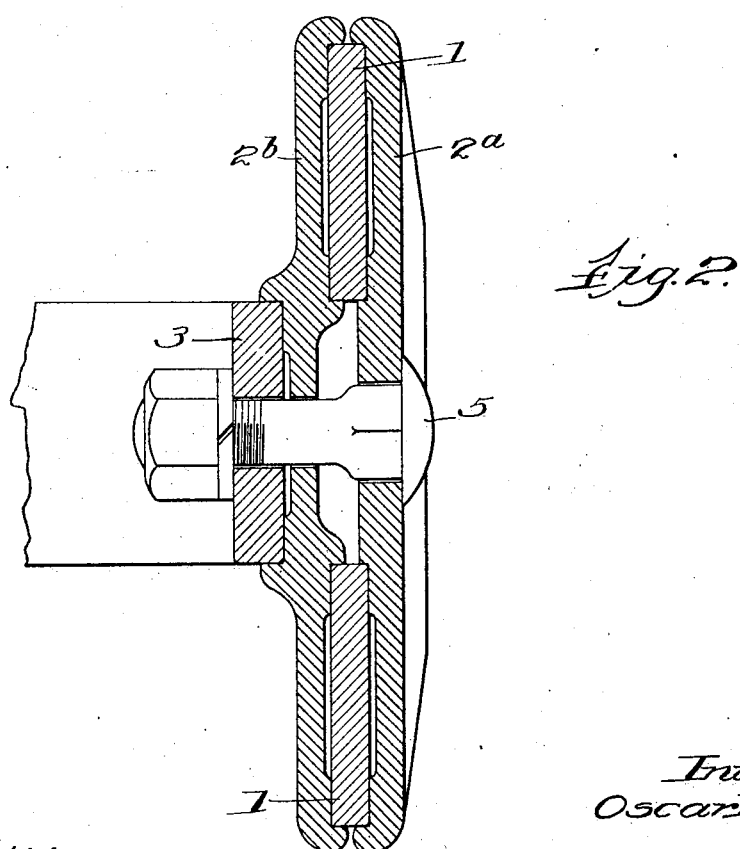
Inventor:
Oscar H. Goetz,
by Bentin Bentin
his Atty's.
Witness:

UNITED STATES PATENT OFFICE.

OSCAR H. GOETZ, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,394,893.  Specification of Letters Patent.  Patented Oct. 25, 1921.

Application filed August 6, 1921. Serial No. 490,299.

*To all whom it may concern:*

Be it known that I, OSCAR H. GOETZ, a citizen of the United States, having residence in Chicago, in the county of Cook and State of Illinois, have invented certain new and useful Improvements in Automobile-Bumpers, of which the following is a specification, reference being had to the accompanying drawings, forming a part thereof.

The purpose of this invention is to provide an improved bumper for automobiles of the spring bar type having duplex impact bar. It consists in the elements and features of construction shown and described, as indicated in the claims.

In the drawings:—

Figure 1 is a perspective view of a bumper embodying this invention.

Fig. 2 is a section at the line, 2—2, on Fig. 1.

The bumper shown comprises an impact member consisting of two transversely extending impact bars, 1, 1, both set vertically edgewise in substantially the same vertical plane, and both having their opposite ends reflexed rearward so as to form end loops as seen at 1ª, the reflexed parts being both flexed vertically, one upward and the other downward, to bring them together at a point about midway between the plane of the upper edge of the upper bar, and that of the lower edge of the lower bar. The two bars, 1, 1, are spaced apart a small distance, preferably not exceeding the vertical width of each bar, and they are secured together by vertical cross ties, 2, 2, to which the supporting arms, 3, 3, of the bumper are secured for attaching the bumper to the vehicle. Preferably the vertically flexed ends of the bars are lapped one upon the other and secured together by bolts or rivets, 4. Preferably the vertical cross ties, 2, are two-membered clamps, the two members, 2ª, 2ᵇ, being clamped together for clamping the impact bars, 1, 1, between them, by means of a clamping bolt, 5, which serves also for securing the supporting arm, 3, to the cross ties, and thereby to the impact member.

I claim:—

1. An automobile bumper comprising an impact member having two horizontal transversely extending bars, set vertically edgewise in substantially the same vertical plane, both being similarly reflexed rearward at both ends, and having the reflexed parts at each end flexed vertically toward each other and united, whereby there are formed double-barred hooks for guarding the wheels; and supporting arms secured to both said impact bars at points inward from the end loops respectively.

2. In the construction defined in claim 1, the two bars having at each end a horizontally reflexed and vertically flexed parts the vertically flexed parts being reversed in vertical direction with respect to the bars respectively and secured together.

3. In combination with the construction defined in claim 1, foregoing, vertical ties by which the horizontal bars are secured together at points inward from the supporting arms being secured to said vertical sides respectively.

In testimony whereof, I have hereunto set my hand at Chicago, Illinois, this 2 day of August, 1921.

OSCAR H. GOETZ.